March 6, 1962      J. J. SEYMOUR      3,023,458
INJECTION MOLDING METHOD AND APPARATUS
Filed May 27, 1954      3 Sheets-Sheet 1

INVENTOR.
JAMES J. SEYMOUR
BY Morris Michael Mark
ATTORNEY.

March 6, 1962 J. J. SEYMOUR 3,023,458
INJECTION MOLDING METHOD AND APPARATUS
Filed May 27, 1954 3 Sheets-Sheet 2

INVENTOR.
JAMES J. SEYMOUR
BY
Morris Michael Marks
ATTORNEY.

March 6, 1962     J. J. SEYMOUR     3,023,458
INJECTION MOLDING METHOD AND APPARATUS
Filed May 27, 1954     3 Sheets-Sheet 3

INVENTOR.
JAMES J. SEYMOUR
BY Morris Michael Marks
ATTORNEY

United States Patent Office 3,023,458
Patented Mar. 6, 1962

3,023,458
INJECTION MOLDING METHOD AND
APPARATUS
James J. Seymour, Hatboro, Pa., assignor of twenty-five percent to Morris Michael Marks, and twenty percent to Milton I. Ross
Filed May 27, 1954, Ser. No. 432,746
17 Claims. (Cl. 18—30)

In the use of injection molding machines hitherto known, serious problems have arisen with respect to the molding operation. Thus, small sprues are formed on each molded object between the runner and said object, thereby causing considerable wastage in time, labor and material. Thus, for instance, time is lost in the plasticizing of additional material to form the sprues, and in opening and closing the molds the additional distance to permit the removal of molded objects having said sprues; labor is required to disengage the sprues from said runner and to remove said objects from the molds, and also to knock off the sprues from the objects; and material is lost in the accumulation of used plastic in the form of knocked-off sprues beyond the percentage of such used plastic which may legitimately be used in combination with virgin plastic.

Moreover, the removal from the mold of molded objects having sprues often requires the imposition of stresses and strains on the still warm object such as to warp said object and to destroy its value. The necessity for sprues in the systems hitherto known not only requires their removal, but also mars the appearance of the molded object and frequently weakens or destroys said object at the place of removal. Because of this, the locations where sprues may be disposed are of necessity limited, and oftentimes result in requiring a longer flow of plasticized material from the sprues to portions of the molded object such that when portions of the flow meet each other they have cooled to such an extent as to weaken the weld. Attempts have been made in the past to provide mechanical means for removing the sprues, but these have been expensive and inefficient and required elaborate changes to the molding machine.

Not only so, but in injection molding machines hitherto known, serious and deleterious problems arise from the occurrence of drooling in the sprue cavity, the formation of cold slugs therein and resultant clogging, dropping of cold plastic between the molds and resultant mashing by the molds, and the disposition of non-homogeneous texture plasticized material in the mold cavity resulting in plastic objects being formed with either harmful internal stresses or inherently weak or brittle portions.

Shutdowns or expensive slowing of operations result from the foregoing, and may also result from the interference caused by the foregoing with the cycle of the automatic feeding mechanism. Thus for instance, when a gate is clogged due to cold slugs or the like, plasticized material is prevented from entering therein and backs up in the injection system, while fresh plastic is being rammed into the same system for subsequent injection operations, resulting in serious and expensive breakdowns in the production schedule.

One object of my invention therefore is to provide apparatus and injection methods which will remove all of the foregoing problems.

Another object of my invention is to provide a hot runner injection molding system which does not require as accurate heat control as is necessary in the systems hitherto known.

A further object of my invention is to provide an injection system and method which produces molded objects without sprues, eliminates drooling, prevents clogging and cold slugs as well as the jamming of the feeding mechanism resulting therefrom.

Another object of my invention is to provide a molding system which produces unwarped molded objects of uniform texture, strength and appearance and at much lower cost due to savings in labor and material, marked reduction in wastage and spoilage, and greater speed and efficiency in production.

A further object of my invention is to provide means for building up the pressure of plasticized material before injection into the mold cavity, and in such a manner as to prevent ooze from entering the cavity prior to the initial surge.

Another object of my invention is to provide an injection molding system whereby the gates are kept free of accumulation of stale plastic or cold slugs.

A further object of my invention is to provide an injection molding system having the foregoing features and which may be used in substantially any standard automatic injection molding machine without expensive modification of said machine.

Other objects of my invention will appear from the more detailed description which follows.

For the purpose of illustrating my invention, I have shown in the accompanying drawings a form thereof which is at present preferred by me, since the same has been found in practice to give satisfactory and reliable results, although it is to be understood that the various instrumentalities of which my invention consists can be variously arranged and organized, and that my invention is not limited to the precise arrangement and organizations of the instrumentalities as herein shown and described.

Referring now to the drawings in which like references indicate like parts:

Figure 1:
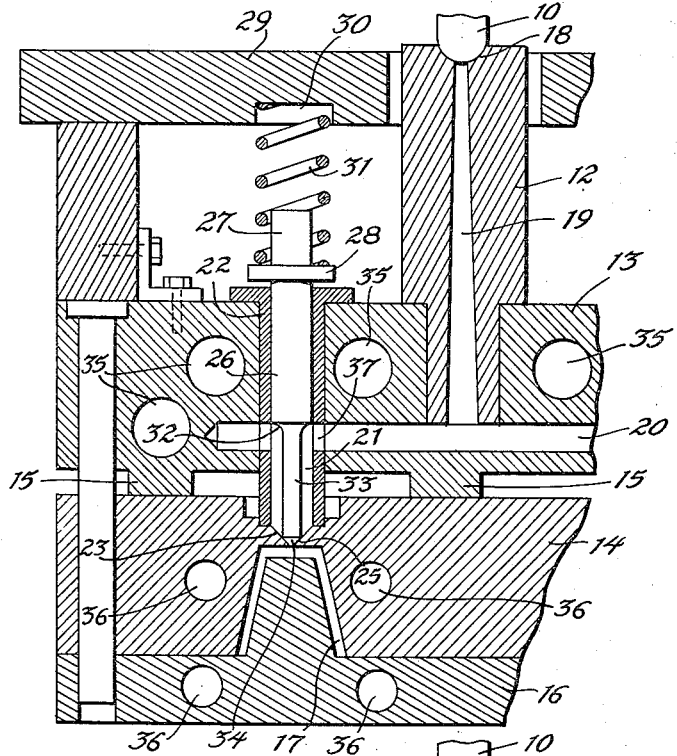
FIGURE 1 represents a vertical sectional view of a portion of a main sprue cavity, die-set and molds and embodying my invention, illustrating the same in substantially the initial stage of operation prior to the first injection of plasticized material thereinto.
Figure 2:
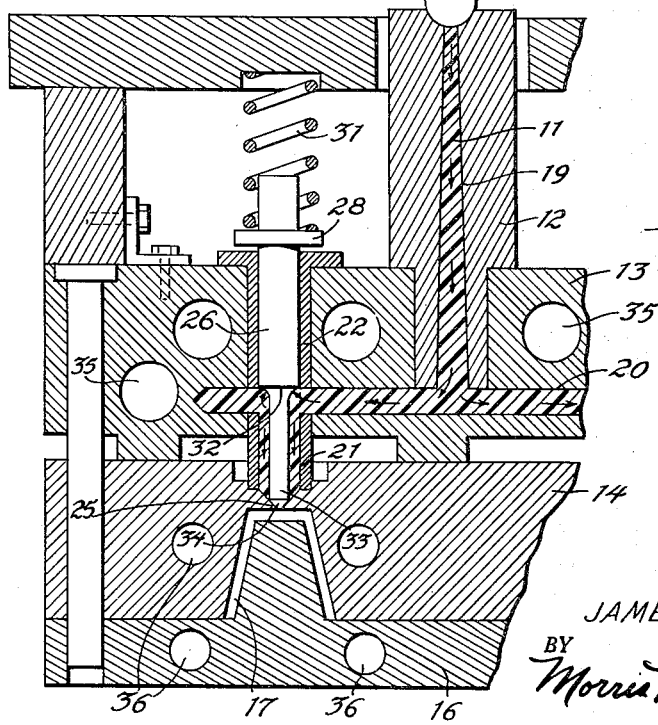
FIGURE 2 represents a vertical sectional view similar to FIGURE 1, but illustrating the same when plasticized material has been injected into the sprue cavity, runner cavity and chamber, and embodying my invention.
Figure 3:
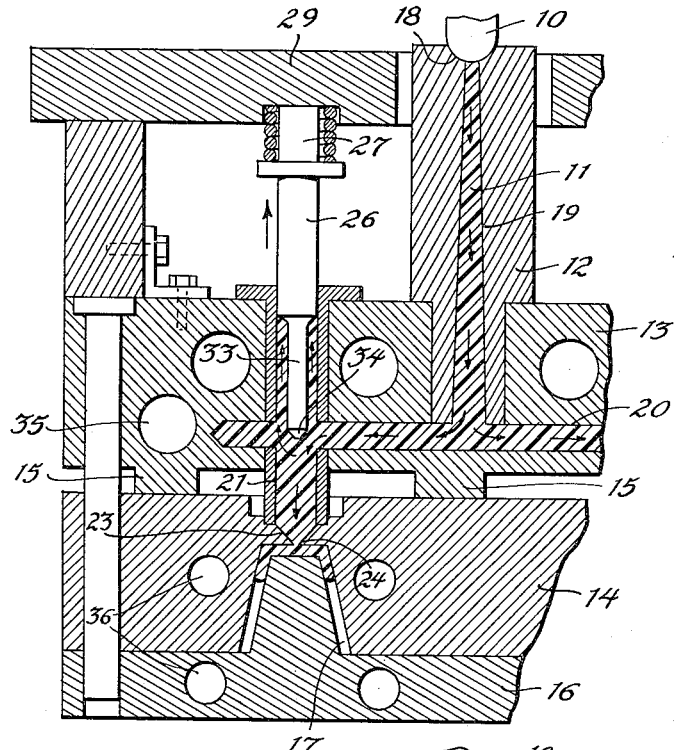
FIGURE 3 represents a view similar to FIGURES 1 and 2, but illustrating the same in a subsequent stage of operation wherein plasticized material is permitted to begin its flow into the mold cavity, and embodying my invention.
Figure 4:
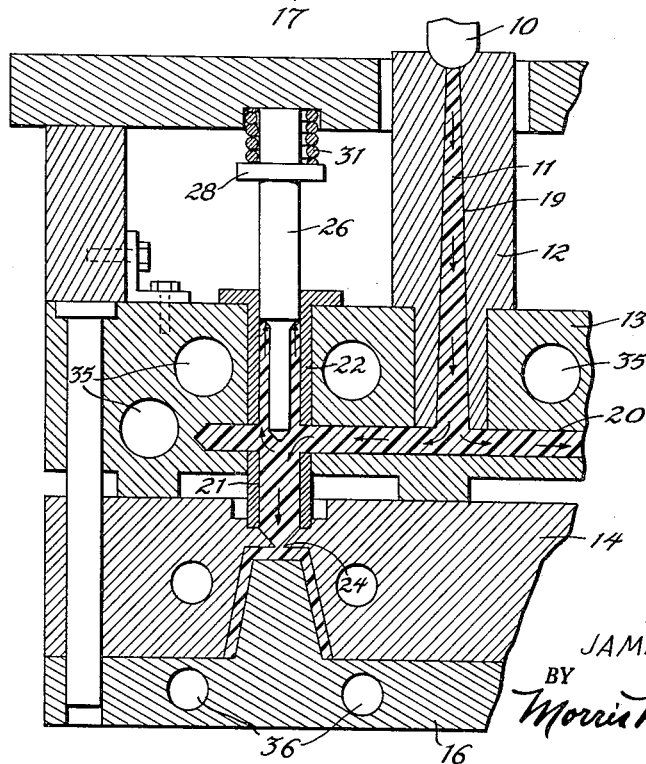
FIGURE 4 represents a view similar to FIGURES 1, 2 and 3, but illustrating a stage of operation subsequent thereto when the mold cavity is completely filled with plastic material.
Figure 5:
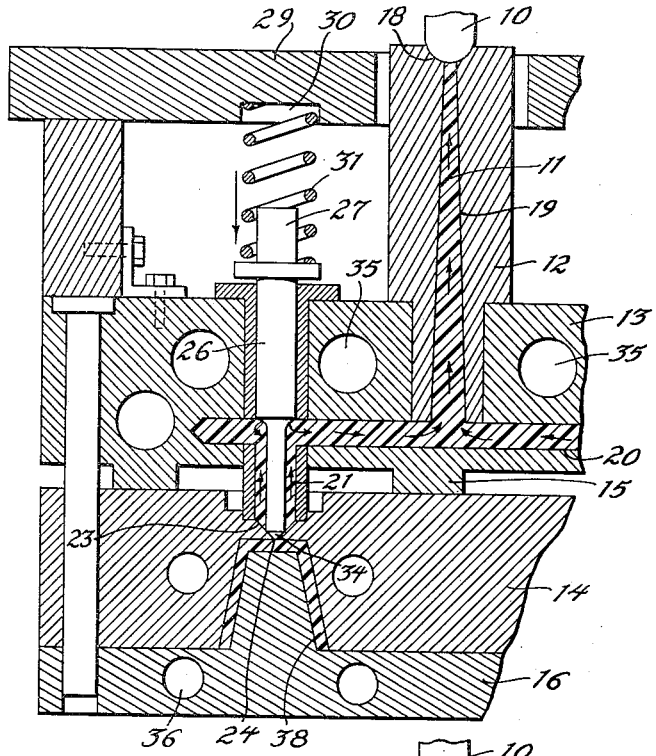
FIGURE 5 represents a vertical sectional view similar to FIGURES 1 to 4 inclusive but illustrating a stage subsequent thereto and when the gate is closed, and embodying my invention.
Figure 6:
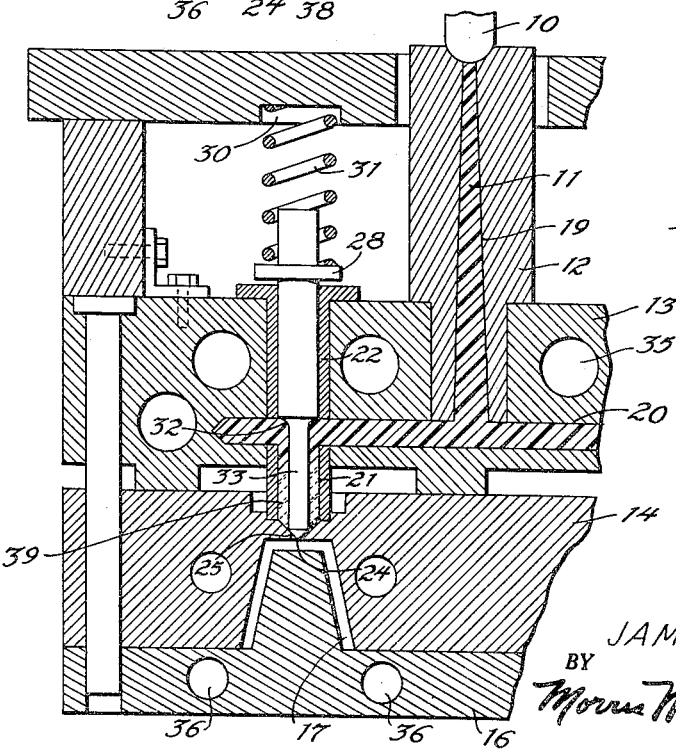
FIGURE 6 represents a vertical sectional view similar to FIGURES 1 to 5 inclusive, but illustraitng the beginning of the next cycle of operation, wherein fresh plasticized material is injected into the main sprue, runner and chamber.

My invention is adapted for use in substantially any standard type of injection molding machine, and is capable of use in any direction; but for purposes of illustration only, it is described herein as a downward injection into horizontal runners which feed downwardly into mold cavities. Thus for instance, a nozzle 10 may be carried by the heating system (not shown) which may be fed by an automatic feeding mechanism (not shown), and adapted to eject plasticized material 11 by the action of an injection ram (not shown) operating under very substantial pressures. A sprue bushing 12 may be mounted on a die-set 13 which in turn may be carried by the frame (not shown) of the injection molding machine. A mold 14 may be carried by the die-set 13 and substantially spaced therefrom by suitable spacer portions 15 operably to provide air insulation between the die-set 13 and the mold 14. A movable mold 16 is mounted on the machine in any suitable manner for cooperation with the mold 14 and the establishment of a mold cavity 17 therebetween. There is thus formed a mold structure which may be configured in any desired form. For purposes of illustration only, the mold 14 may be considered a cavity section, and the mold 16 may be considered a core section. As illustrated the core section 16 comprises a core extension 16' removably extending into the article-molding cavity 17 of the cavity section 14.

A nozzle seat 18 may be formed on the sprue bushing 12, with a sprue cavity 19 extending from said seat 18 to a runner cavity 20 which may be formed through the die-set 13. A chamber 21 is disposed intermediate the runner cavity 20 and the mold cavity 17. The chamber 21 may be disposed in any suitable housing such for instance as the bushing 22 which extends through the die-set 13 and into the mold 14, with a portion 23 of the mold 14 itself serving as a defining element of the chamber 21. This portion 23 preferably comprises a gate 24 substantially surrounded by a valve seat 25 which may be in the form of a hollow cone. The gate 24 preferably opens directly into the mold cavity 17. The runner cavity 20 and chamber 21 may thus be considered a passage means between the sprue cavity 19 and the mold cavity 17.

Suitable pressure-applying or pressure-storage and pressure-responsive means is provided in conjunction with said chamber 21. Thus, a plunger 26 may slideably extend through the chamber housing 22 and preferably projecting externally therefrom as at 27. A spring-seat 28 which may be in the form of a collar surrounding the external projection 27 may be disposed on the plunger 26 and may be formed integrally therewith. A suitable spring-retaining member 29 may be mounted on the die-set 13 or otherwise carried by the machine, and may comprise a spring-retaining recess 30 adapted to anchor one end of a spring such for instance as the compression spring 31 the other end of which may be disposed about the projection 27 in compressive conjunction with the spring seat 28.

The lower end of the plunger 26 comprises a pressure seat portion 32. Projecting beneath the pressure seat portion 32 or otherwise operated by said plunger 26 is a valve member or means 33 which may be formed integrally with the plunger 26 and which has at its lower terminus a seal portion 34 adapted when in its lowermost position to bear against the valve seat 25 and close the gate 24 thereby closing said passage means immediately adjacent its region confluence with said cavity 17, with the outer end of the seal portion 34 terminated in substantially flush registry with the wall formation of said cavity at the mold 14 side thereof.

The runner cavity 20 enters the chamber 21 in an entrance passage 37 disposed substantially intermediate the pressure seat 32 and the valve seat 25 when said plunger 26 is in lowermost position. Channels 35 are disposed in the die-set for carrying suitable heating means (not shown) in close proximity to the runner cavity 20 and chamber 21. Channels 36 are disposed in the molds 14, 16 for carrying suitable cooling means (not shown) for cooling and aiding in the curing of the plastic in the mold cavity 17.

In operation, the chamber 21 is normally in closed condition with respect to the mold cavity 17, the spring 31 urging the plunger 26 downwardly, with its valve member 33 projecting downwardly therefrom and into gate-closing contact with the valve-seat 25. The plastic material is fed into the heating system (not shown) and is ejected therefrom through the nozzle 10 by the injection ram (not shown). The thus plasticized material 11 may thus be passed into the sprue cavity 19, runner cavity 20 and into the chamber 21.

During the flow of the plasticized material 11, the pressure therein is substantially at a minimum, but when the chamber 21 is filled, the pressure is exerted in all directions and accumulates against the pressure seat 32 as the injection ram (not shown) continues its downward thrust. Ultimately, the pressure against the pressure seat 32 has accumulated to such a degree as to overcome the inertia of the spring 31 and thereby permit the plunger 26 to rise thereagainst. In so doing, the plunger 26 carries with it the valve member 33 and the sealing portion 34 operably to withdraw said sealing portion 34 from the valve seat 25 and to open the gate 24. In so doing, the pressure against the pressure seat 32 is not materially reduced, for the cross-sectional area of the gate 24 is preferably very substantially less than the cross-sectional area of the pressure seat 32. The valve member 33 is accordingly retained in withdrawn position, and the plasticized material 11 is thus permitted to be discharged into the mold cavity 17. This discharge occurs very suddenly, for pressure has been built up to a marked degree in the chamber 21, being the accumulation of the flow pressure, plus the pressure needed to overcome the inertia of the spring 31, plus the pressure exerted by the continuing downward thrust of the injection ram (not shown). Hence, the plasticized material 11 quickly flows directly from the chamber 21 to the mold cavity 17 wherein it is permitted to cool.

In accordance with the cycle of operation of the injection ram (not shown) the ram is withdrawn very shortly after the completion of filling of the mold cavity 17. When this occurs, downward pressure is removed from the main sprue cavity 19, and pressure is thus released from the runner cavity 20 and the chamber 21. This permits the spring 31 to force the plunger 26 downwardly until the sealing portion 34 bears against the valve seat 25, thereby closing the gate 24. In so doing, the sealing portion 34 cuts off any plastic material which may have been disposed between the material 38 in the mold cavity 17 and the plasticized material 11 in the chamber 21; and this occurring directly at the gate of the mold cavity itself, no sprue exists or is permitted to be formed on the molded object.

The plastic material 38 in the mold cavity 17 may now be cured and removed from between the molds 14 and 16 without necessity of opening the molds any extra distance for removal of a sprue portion of the object formed by the plastic 38. Not only so, but the gate 24 being closed, the plasticized material in the heated chamber 21 is sealed off against curing, no drool can occur and no cold slug can be formed therein to clog the gate. Indeed, the passage to the gate 24 is kept clean by the non-plastic valve member being disposed therein when the gate is closed and being mechanically withdrawn therefrom when plasticized material is to flow therethrough. Thus, no clogging can possibly occur.

When the molds 14, 16 are again closed, the next cycle of operation may again be begun. In so doing, a residue of plasticized material 39 may have remained in the chamber 21 from the previous cycle of operation. Although the chamber 21 is heated, this material may have cooled to some extent; but it is prevented from clogging any operation of the device by the valve member 33 bearing against the valve seat 25. When the next injection of plasticized material 11 is urged through the main sprue cavity 19, runner cavity 20 and into the chamber 21, pressure is again built up to overcome the inertia of the spring 31. In so doing, the residue of plasticized material 39 which had remained in the chamber 21 is subjected not only to the fresh heat of the newly injected plasticized material, but also to the markedly accumulated pressure within the chamber 21, thereby assimilating said residue plastic 39 in said freshly injected plastic material 11 and substantially forming a homogeneous mass of plastic within said chamber 21, said mass being of substantially the same consistency, texture and characteristics throughout. Further accumulation of pressure causes the withdrawal of the valve member 33 and the opening of the gate 24 whereupon the homogeneous mass of plastic within the chamber 21 is forceably injected into the mold cavity 17. Continued operation of this cycle is substantially similar to that which has been hereinabove described for the first cycle.

It is to be understood that the description of the chamber 21 as being intermediate a runner cavity and the mold cavity is for purposes of illustration only, and that for purposes of this description and claims the term "runner" is to be construed as including "main sprue" and any intermediate sprues.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

What I claim as new and desire to secure by Letters Patent is:

1. In an injection molding machine, the combination of a mold having a mold cavity; a runner cavity; a chamber adapted to receive from said runner cavity plasticized material under pressure, and disposed intermediate said runner cavity and said mold cavity; said chamber having a gate comprising a valve seat disposed substantially at the entrance to said mold cavity; a valve member mounted on said machine and having a sealing portion, said sealing portion being adapted to close said gate and to sever plasticized material which may be disposed between said sealing portion and said valve seat; plunger means disposed in said chamber; said valve member being actuated by said plunger means; resilient means disposed on a portion of said machine and bearing against said plunger means operably to urge said sealing portion of said valve member against said valve seat; and said plunger means comprising means adapted to receive pressure from said plasticized material operably to impart movement to said plunger means and thereby to urge said sealing portion of said valve member away from said valve seat.

2. In an injection molding machine, the combination of a mold having a mold cavity; a runner cavity; a chamber adapted to receive from said runner cavity plasticized material under pressure, and disposed intermediate said runner cavity and said mold cavity; said chamber having an entrance communicating with said runner cavity, and a gate leading to said mold cavity; said gate comprising a valve seat disposed substantially at the entrance to said mold cavity; a valve member mounted on said machine and having a sealing portion, said sealing portion being adapted to close said gate substantially at said entrance to said mold cavity; said chamber comprising pressure-responsive means actuating said valve member operably to retain said valve member in gate-closing relation to said valve seat, to receive pressure from plasticized material disposed in said chamber and at a given pressure to withdraw said sealing portion from said valve seat.

3. Injection-molding apparatus comprising: a mold structure including relatively movable core and cavity sections, said core section being formed with a core extension removably received in an article-molding cavity open at one end and closed at its other end and formed in said cavity section; passage means for advancing an article-molding material under pressure flow into said cavity through the closed end thereof when said cavity is occupied by said core extension; movable valve means disposed in said passage means immediately adjacent its region of confluence with said cavity said valve means when in its position of closure having its outer end terminated in substantially flush registry with the wall formation of the closed end of said cavity; means responsive to the pressures of molding material advancing through said passage means for maintaining said valve means in an open position in admitting of the flow of said molding material into said cavity; and pressure-applying means removed from contact with said materials and acting constantly on said valve means to move the latter toward and maintain the same in its position of passageway closure when the pressures exerted on said valve means by the molding material advancing through the passage means fall below those applied to said valve means by said constantly acting pressure means.

4. Injection-molding apparatus comprising: a mold structure including relatively movable core and cavity sections defining therebetween an article-molding cavity; passage means for advancing an article-molding material under pressure flow into said cavity; movable valve means disposed in said passage means immediately adjacent its region of confluence with said cavity, said valve means when in its position of closure having its outer end terminated in substantially flush registry with a wall formation of said cavity; means responsive to the pressures of molding material advancing through said passage means for maintaining said valve means in an open position in admitting of the flow of said molding material into said cavity; and pressure-applying means removed from contact with said molding material and acting constantly on said valve means to move the latter toward and maintain the same in its position of passageway closure when the pressures exerted on said valve means by the molding material advancing through the passage means fall below those applied to said valve means by said constantly acting pressure means.

5. Injection-molding apparatus comprising: a mold formed with an article-molding cavity; passage means of restricted cross-sectional area for advancing an article-molding material under high pressure through said passage means and into said cavity; movable valve means disposed in said passage means for governing molding material flow therethrough, said valve means being disposed immediately adjacent to the region of juncture of the passage means with said cavity to cause said valve means when in its position of closure to form a part of the wall formation of said cavity; means responsive to the pressure of the molding material being forced through said passage means to maintain automatically said valve means in its open position; and means removed from contact with said material for applying constantly to said valve means forces in opposition to those exerted thereon by the advance of the molding material, whereby to produce automatically passage means closure of said valve means when the molding material pressures fall below predetermined values.

6. Injection-molding apparatus comprising: a mold formed with an article-molding cavity; passage means formed in said mold for conducting an article-molding material under pressure from a source of supply to said cavity; a valve movable into and out of engagement with the walls of an orifice provided at the region of juncture of the passage means with said cavity, said valve when seated forming a substantially flush continuation of the wall formation of said cavity; a piston slidable in said mold and on which said valve is directly mounted; means for applying on the valve-carrying side of said piston the pressure of the molding material advancing through said passage means, whereby to maintain said valve in an open position during an intermittent period of pressure advance of the molding material; and pressure-producing means removed from contact with said material and acting constantly on the opposite side of said piston from that carrying said valve to move the latter toward and maintain the same in its position of passage closure when the pressures exerted on said piston by the molding material fall at the conclusion of a period of material advancement below those of the constantly acting pressure-producing means.

7. Injection-molding apparatus comprising: a mold formed with a molding cavity and including a passage of cross-sectionally restricted area for the intermittent advance of a flowing molding material under pressure from a source of supply to said cavity; movable valve means arranged in said passage immediately adjacent to its point of entry into said cavity, said valve means when seated forming a substantially flush continuation of the wall formation of said cavity; means responsive to the pressure of the molding material during its advance through said passage toward said cavity to maintain said valve means open for material flow into said cavity; and means removed from contact with said material and acting uniformly and constantly on said valve means and in oppositon to said molding material forces to maintain the valve means in a position of passage closure when the forces exerted by the molding material in its advance through said passage fall below those applied to the valve means by the constantly acting pressure means.

8. Injection-molding apparatus as defined in claim 7, and wherein the apparatus is further characterized by disposing the valve means so that when the same occupies a position of passage closure following the filling of the cavity with article-forming quantities of the molding material, said valve means will form a component part of the wall formation of the cavity, whereby substantially to eliminate from the finally molded article, the presence on its outer wall of an integral passage-formed runner or appendage.

9. Injection-molding apparatus comprising a mold structure formed with an article-molding cavity; passage means formed in said mold structure for the advancement of a heated stream of molding material in a plastic mobile condition; said passage means including adjacent to its region of juncture with said cavity a high-pressure molding material-receiving chamber which terminates at its forward end in a restricted valve-seating orifice opening directly into said cavity; a valve having an elongated body and slidably mounted in said high-pressure chamber in molding material-confining engagement with the walls thereof, said valve at one end of said body being formed with a substantially rigid axially disposed forward and longitudinally extending stem, the latter possessing a reduced diameter as compared with that of said body to provide thereon within said high-pressure chamber a face against which molding material introduced through said bore and confined under pressure may react to produce movement of the valve in a manner withdrawing said stem from its seated position of engagement with the walls of said orifice to an unseated position spaced from said orifice walls, whereby to open said orifice for the forced flow therethrough of said molding material into said cavity, said stem when in seated engagement with the orifice walls having its outer end disposed in flush registry with a wall of said cavity; and means adapted to impose pressure on said valve in a manner serving to maintain the stem of said valve in a position of orifice closure when said last-mentioned pressure exceeds that of the molding material in said high-pressure chamber.

10. In an injection molding machine; a die having a molding surface and passage means through which plastic materials may be forcibly passed to said molding surface; said passage means terminating in a discharge orifice at said molding surface; injection means for forcing plastic material through said passage means toward the discharge orifice thereof; a sprue cut-off pin movably mounted in said die in spaced relation to said injection means and having an outer end, said pin normally extending into said passage means in alignment with the discharge orifice thereof; and means independent of said injection means for moving said pin in the general direction of flow of plastic material toward said discharge orifice and to a position at which said pin closes the orifice of said passage means and is disposed in substantially flush relation to said molding surface.

11. In an injection molding machine; a die having a molding surface and passage means terminating at one end in a relatively restricted discharge orifice opening at said molding surface; injection means communicating with said passage means at the end thereof opposite said discharge orifice and operative to force plastic material through said passage means toward the discharge orifice thereof; an elongated sprue cut-off pin movably mounted in said die in spaced relation to said injection means and having an outer end portion disposed within said passage means, said pin being movable within said die in the direction of flow of plastic material toward said discharge orifice to a position at which the outer end of said pin closes said discharge orifice and is disposed in substantially flush relation to the molding surface of said die; and means, responsive to the pressure of said plastic material in said passage, for moving said pin away from said discharge orifice.

12. The method of injection molding a plastic, comprising plasticizing a material; urging said plasticized material into a chamber having a movable wall and a gate having a closure member forming part of a mold cavity when said gate is in closed condition; said closure member being connected to said movable wall operably to be moved between gate closing and gate opening condition by the movement of said movable wall; increasing the pressure of said plasticized material while holding said movable wall in check by means disposed exterior of said chamber; permitting said movable wall to be displaced by the pressure of said plasticized material; opening said gate by the movement of said wall and permitting said plasticized material to flow through said gate directly into said mold cavity; releasing the first-mentioned pressure on said plasticized material; and closing said gate.

13. The method of injection molding a plastic, comprising plasticizing a material; urging said plasticized material into a chamber having a movable wall and a gate having a closure member forming part of a mold cavity when said gate is in closed condition; said closure member being connected to said movable wall operably to be moved between gate closing and gate opening condition by the movement of said movable wall; increasing the pressure of said plasticized material while holding said movable wall in check by means disposed out of contact with said plasticized material; permitting said movable wall to be displaced by the pressure of said plasticized material; opening said gate by the movement of said wall and permitting said plasticized material to flow through said gate directly into said mold cavity; releasing the first-mentioned pressure on said plasticized material; and closing said gate, severing plastic material disposed between said chamber and said mold cavity, said severance taking place substantially at said mold cavity.

14. The method of injection molding a plastic, comprising plasticizing a material; urging said plasticized material into a chamber having a closed gate comprising a closure member forming part of a mold cavity when said gate is in closed condition; increasing the pressure of said plasticized material in said chamber; opening said gate by means responsive to said pressure, and permitting said plasticized material to flow through said gate directly into said mold cavity; releasing the pressure on said plasticized material; and closing said gate by means disposed out of contact with said plasticized material.

15. The method of injection molding a plastic, comprising plasticizing a material; urging said plasticized material into a chamber having a closed gate comprising a closure member forming part of a mold cavity when said gate is in closed condition; increasing the pressure of said plasticized material in said chamber; opening said gate by means responsive to said pressure, and permitting said plasticized material to flow through said gate directly into said mold cavity; and closing said gate by means disposed out of contact with said plasticized material.

16. The method of injection molding a plastic, comprising plasticizing a material; urging said plasticized material into a chamber having a closed gate comprising a closure member forming part of a mold cavity when said gate is in closed condition; increasing the pressure of said plasticized material in said chamber; opening said gate by means responsive to said pressure, and permitting said plasticized material to flow through said gate directly into said mold cavity; and closing said gate by means disposed out of contact with said plasticized material, severing substantially all plastic material disposed exterior of said mold cavity from the plastic material disposed in said mold cavity.

17. The method of injection molding a plastic, comprising imposing pressure on plasticized material within a a chamber having a closed gate whose closure member forms part of the wall of a mold cavity when said gate is in closed condition; opening said gate and permitting said plasticized material to be discharged directly into the interior of said mold cavity; and closing said gate in a manner to sever said plasticized material at said mold cavity.

References Cited in the file of this patent

UNITED STATES PATENTS

| | | |
|---|---|---|
| 1,939,831 | Scheible | Dec. 19, 1933 |
| 1,983,602 | Daubenmeyer | Dec. 11, 1934 |
| 2,227,263 | Knowles | Dec. 31, 1940 |
| 2,254,233 | Meyer | Sept. 2, 1941 |
| 2,318,031 | Tucker | May 4, 1943 |
| 2,567,147 | Cousino | Sept. 4, 1951 |
| 2,637,073 | Walther | May 5, 1953 |
| 2,668,325 | Goodwin | Feb. 9, 1954 |
| 2,770,011 | Kelly | Nov. 13, 1956 |

FOREIGN PATENTS

| | | |
|---|---|---|
| 912,194 | France | Aug. 1, 1946 |
| 962,727 | France | Dec. 12, 1949 |